(12) United States Patent
Starzak

(10) Patent No.: US 8,609,974 B2
(45) Date of Patent: Dec. 17, 2013

(54) SOLAR TO ELECTRICAL ENERGY CONVERSION USING THE STREAMING POTENTIAL

(76) Inventor: Michael E. Starzak, Vestal, NY (US)

( * ) Notice: Subject to any disclaimer, the term of this patent is extended or adjusted under 35 U.S.C. 154(b) by 434 days.

(21) Appl. No.: 12/197,198

(22) Filed: Aug. 22, 2008

(65) Prior Publication Data

US 2009/0023052 A1 Jan. 22, 2009

Related U.S. Application Data

(63) Continuation-in-part of application No. 10/965,484, filed on Oct. 14, 2004, now abandoned.

(51) Int. Cl.
*H02N 6/00* (2006.01)
*H01L 25/00* (2006.01)
*H01M 6/30* (2006.01)
*H01M 2/00* (2006.01)

(52) U.S. Cl.
USPC ........... 136/243; 136/263; 136/251; 429/111; 429/112; 429/80; 429/51

(58) Field of Classification Search
USPC .............. 429/51, 80, 111, 112; 136/263, 243, 136/251
See application file for complete search history.

(56) References Cited

U.S. PATENT DOCUMENTS

| 2,705,948 | A |   | 4/1955 | Rostock |
| 3,790,305 | A | * | 2/1974 | Ledner ............................. 417/53 |
| 4,280,333 | A | * | 7/1981 | Corliss et al. ................ 62/259.1 |
| 4,401,548 | A |   | 8/1983 | Brezinski |
| 5,074,283 | A | * | 12/1991 | Beatty et al. .................. 126/618 |
| 6,198,037 | B1 |   | 3/2001 | Nakata |
| 6,440,600 | B1 |   | 8/2002 | Starzak |
| 6,607,513 | B1 | * | 8/2003 | Down et al. .................... 604/239 |
| 6,994,155 | B2 | * | 2/2006 | Dessiatoun et al. .......... 165/165 |
| 2003/0089861 | A1 |  | 5/2003 | Kawashima |
| 2003/0164188 | A1 |  | 9/2003 | Murai et al. |
| 2003/0183271 | A1 |  | 10/2003 | Ikeda et al. |
| 2006/0081286 | A1 |  | 4/2006 | Starzak |
| 2006/0193066 | A1 | * | 8/2006 | Prueitt .......................... 359/853 |
| 2007/0131223 | A1 |  | 6/2007 | Gorsuch |
| 2008/0041717 | A1 |  | 2/2008 | Tremblay et al. |

FOREIGN PATENT DOCUMENTS

KR 10-2001-000554 A 1/2001

OTHER PUBLICATIONS

PCT/ISA/237—Written Opinion of the International Search Authority for corresponding PCT International Application No. PCT/US2009/054593 filed Aug. 21, 2009, dated Feb. 24, 2010.
PCT/ISA/210—International Search Report of the International Search Authority for corresponding PCT International Application No. PCT/US2009/054593 filed Aug. 21, 2009, dated Feb. 24, 2010.

* cited by examiner

*Primary Examiner* — Jennifer Michener
*Assistant Examiner* — Marla D McConnell
(74) *Attorney, Agent, or Firm* — Heslin Rothenberg Farley & Mesiti P.C.; Victor A. Cardona, Esq.

(57) ABSTRACT

A system and method is presented that uses solar power driven expansion of an electrolytic solution to force the electrolytic solution from a container through at least one pore of an insulator having a fixed surface charge of one polarity into a collection receptacle. The velocities of the cations and anions flowing through the pore differ because of the fixed surface charge of the pore and this produces an electrical charge separation, the streaming potential, as a source of electrical power. Energy absorption spans the full solar spectrum including infrared, visible and near ultraviolet wavelengths.

19 Claims, 3 Drawing Sheets

SOLAR TO ELECTRICAL ENERGY CONVERSION USING THE STREAMING POTENTIAL

CROSS-REFERENCE TO RELATED APPLICATIONS

This application is a Continuation-in-Part of U.S. patent application Ser. No. 10/965,484, filed Oct. 14, 2004, the disclosure of which is incorporated herein by reference in its entirety.

FIELD OF THE INVENTION

The present invention relates to a system and method of generating electricity and in particular, to a system and method of converting solar radiation to electrical energy using the thermal expansion of an electrolytic fluid to create a streaming potential.

BACKGROUND OF THE INVENTION

Solar energy is the most fundamental source of energy. It produces the gradients responsible for renewable energies such as wind and water, and was responsible for production of the organic matter that now constitutes fossil fuel. Chemical conversion of solar energy to electrical energy occurs with biological photosynthesis and with photovoltaic cells. Both operate in a limited range of the solar spectrum. The present invention is an entirely new system and method for solar to electrical energy transduction that can utilize the entire solar spectrum. The streaming potential and the electrokinetic phenomenon utilized for transduction in this invention, has also been used to produce electrical power from wind power (Starzak, U.S. Pat. No. 6,440,600). The foregoing invention uses the pressure differential caused by the flow of wind (or water) over a surface containing pores with fixed surface charge. The pressure differential draws electrolytic solution on the opposite side into the pores to produce the charge separation and streaming potential and current. This is in contrast with the present invention where the expansion of the electrolytic solution by solar heating forces the electrolytic solution through the pores to produce the charge separation, streaming potential, and streaming current. Since wind creates a pressure differential to draw electrolytic solution through the pores and electrolyte expansion forces electrolytic solution through the pores, both methods of electrolytic solution flow in pores can be combined into a single unit to tap both renewable energy sources.

The invention is constructed in sizes that permit its use on individual buildings or larger energy farms. Its component materials are lightweight to make the invention easy to install and maintain. The component materials are inexpensive and the method of construction allows the commercial device to be produced at a competitive retail cost with a short payback period for energy savings.

SUMMARY OF THE INVENTION

The present invention relates to a system for generating electrical energy from solar energy, and more specifically, to a system that converts the full spectrum of solar radiation to electrical energy using the thermal expansion of an electrolytic solution.

An aspect of the present invention relates to a system for generating electrical energy. The system comprises an insulator having at least one pore that contains a fixed surface charge of one polarity; a container receiving an electrolytic solution, the container in fluid communication with the at least one pore of the insulator; a solar radiation absorber configured to transfer heat to the electrolytic solution of the container to cause thermal expansion of the electrolytic solution such that the electrolytic solution flows from the container through the at least one pore of the insulator; a collection receptacle connected to the at least one pore of the insulator to receive the electrolytic solution that has passed through the pore from the container; a first electrode contacting the electrolytic solution on a first side of the insulator; and a second electrode contacting the electrolytic solution on a second side of the insulator, the second side opposite the first side relative to the insulator.

A second aspect of the present invention relates to a method for generating electricity. The method comprises: providing an insulator having at least one pore that contains a fixed surface charge of one polarity; providing a container with an electrolytic solution therein, the container in fluid communication with the at least one pore of the insulator; exposing a solar radiation absorber to solar radiation; transferring heat from the solar radiation absorber to the electrolytic solution thereby thermally expanding the electrolytic solution; connecting a first electrode to the electrolytic solution on a first side of the insulator; connecting a second electrode to the electrolytic solution on a second side of the insulator, the second side opposite the first side relative to the insulator; flowing the electrolytic solution from the container through the at least one pore to generate an electrical current between the first electrode and the second electrode; receiving the electrolytic solution flowing from the container through the at least one pore in a collection receptacle connected to the at least one pore.

DETAILED DESCRIPTION OF THE INVENTION

Throughout the specification the terms and substituents are defined when first introduced and retain their definitions.

The present invention relates to a system for generating electrical energy from solar energy. The system can be mounted on a roof or embedded in a driveway. The system absorbs solar energy over an extended wavelength region (visible, infrared and near ultraviolet) to heat an electrolytic solution that expands, thereby forcing the electrolytic solution through at least one pore of an insulator. The pore of the insulator contains a fixed surface charge of a single polarity. The different velocities of cations and anions of the electrolytic solution flowing through the pore produced by the fixed surface charge in the pore wall, produces a charge separation in the electrolytic solution that manifests as an electrical streaming potential and current. The electrolytic solution that passes through the pore is collected and reused. The electrical potential and current appear between a first electrode contacting the electrolytic solution being thermally expanded and a second electrode contacting the electrolytic solution as it exits the pore.

Figure 1:
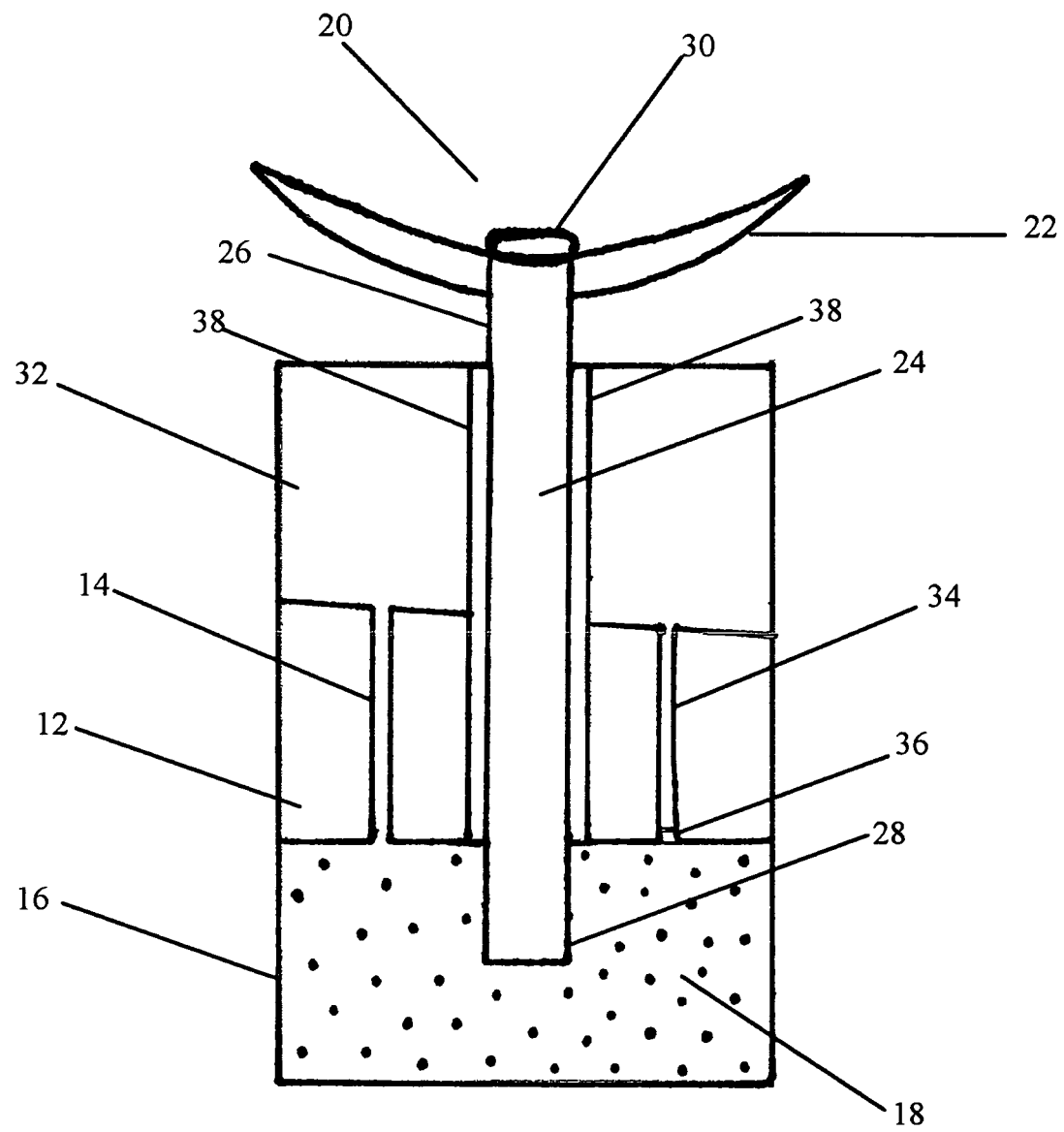
FIG. 1 is a cutaway front view of a system for generating electrical energy in accordance with the present invention.

Referring to FIG. 1, the system is comprised of an insulator 12 with at least one pore 14 having a fixed charge of one polarity, and at least one return channel 34 having a neutral charge. The surface of each pore 14 contains a fixed charge of one polarity. The number of pores in the insulator 12 may vary, as may the diameter of the pore 14. As shown, the insulator 12 has one pore 14. In one embodiment, the pore 14 is of such a diameter as to support a Poiseuille or lamellar flow of fluid through the pore 14.

The insulator 12 may be formed of a first material, such as plastic, and the pore 14 comprised of a second, different material with a fixed surface charge of one polarity, such as glass, which has a negative intrinsic surface charge. In one embodiment, the pore 14 has an interior diameter and an exterior diameter sufficient to snugly fit in a bore hole formed in the insulator 12. In an alternative embodiment, the pore of the insulator is chemically coated to produce a fixed surface charge of a single polarity. The technology of such charged surface coating is extensively developed in capillary electrophoresis. See, e.g. Altria, "Capillary Electrophoresis Guidebook" or Li, "Capillary Electrophoresis", the contents of which is incorporated by reference in its entirety.

The diameter of the pore 14 is small enough to use surface tension to limit the flow of an electrolytic solution 18 through the pore 14 but sufficiently large enough to provide an outlet for the electrolytic solution 18 as the electrolytic solution 18 expands with solar heating. The size and charge of the ions comprising the electrolytic solution 18 also dictates flow under expansion. A cross section of the electrolytic solution 18 velocity vectors in the pore is parabolic with the velocity of the flow cylinders increasing with increasing distance from the pore wall. The streaming potential appears when the counterions (positive ions for a negatively charged pore wall) are drawn into the slower (or stationary) solution cylinder near the pore wall and co-ions are repelled into the faster moving inner cylinders. The different ion speeds produce a separation of charge along the direction of flow and the streaming potential appears across the ends of the pore 14.

The system further comprises a container 16 receiving the electrolytic solution 18 for heat absorbtion. The container 16 is in fluid communication with at least one pore 14 of the insulator 12. The ions of the electrolytic solution 18 can be large, multi-charged ions, such as latex spheres; metal ions, such as sodium cation and chloride anions; or polyvalent ions, such as highly charged latex spheres. The choice is predicated on the production of the largest separation of charge for a given pore size and configuration.

The separation of charge and the streaming potential is maximized when counterions remain nearly stationary near the wall of the pore 14 while the co-ions are repelled toward the center of the pore 14 where the velocity is greatest. For small ions, the distance from the pore wall is defined by the Debye length, the average distance for excess counterions from the surface. The Debye length in a charge density continuum model, rather than a discrete ion model, is determined by the ionic strength of the electrolytic solution 18. With this model, the Debye length will decrease with ionic strength which is proportional to the square of the ion charges. Highly charged ions will then give an ionic strength much larger than their concentration and the double layer will decrease, counterions and co-ions will be closer together, and the velocity gradient that gives the streaming potential will decrease.

The continuum model is applicable for an electrolyte in which the co-ions are large multi-charged particles such as latex spheres. The small counterions establish the double layer region but the co-ions are repelled further from the surface because of their large net charge. Thus, a large number of charges will move in the faster moving cylinder to convert the energy in the flow more effectively. If the pore has a size comparable to the co-ions, these co-ions will move toward the fastest moving, central portion of the pore.

The system further comprises a solar radiation absorber 20 configured to transfer heat to the electrolytic solution 18 of the container 16. The heat transfer causes thermal expansion of the electrolytic solution 18 such that the electrolytic solution 18 flows from the container 16 through at least one pore 14 of the insulator 12.

The solar radiation absorber 20 comprises a reflector 22 and a heat conducting element 24 having a first end 26 and a second end 28. As shown, the first end 26 is connected to at least a portion of the reflector 22 and the second end 28 contacts the electrolytic solution 18. In an alternative embodiment, the reflector 22 may have a central hole through which the first end 28 of the heat conducting element 24 may extend. When the reflector 22 is exposed to solar radiation, solar radiation striking the reflector 22 is transferred as heat from the reflector 22 to the heat conducting element 24, and subsequently transferred through the heat conducting element 24 to the electrolytic solution 18. The container 16 may also be insulated to prevent heat loss.

In one embodiment, the reflector 22 is a mirror. The reflector 22 may be formed of a highly reflective plastic or coated with a film of reflective metal. As shown in FIG. 1, the reflector 22 is formed in a shallow parabolic shape to permit some absorption of the oblique rays of the sun. The reflector 22 may also be configured in a variety of other shapes to absorb solar radiation. The reflector 22 may be rotational or have a mechanism for automatically rotating the reflector 22 so that the reflector 22 is always perpendicular to the incoming rays, maximizing solar energy collection.

The heat conducting element 24 transfers heat from the reflector 22 to the electrolytic solution 18 in the container 16. As shown, the heat conducting element 24 is a rod. The heat conducting element 24 may be formed of carbon, copper, or another heat conducting material. The heat conducting element 24 may also comprise a heat pipe formed of a suitable material to facilitate the transfer of heat at ambient temperatures.

In one embodiment, the heat conducting element 24 is a rod that gradually tapers as it enters the container 16 to concentrate the heat for transfer, such that the diameter of the second end 28 of the heat conducting element 24 is smaller than the diameter of the first end 26.

In one embodiment, the solar absorbing device 20 comprises the reflector 22, the heat conducting element 24 and a radiation absorbing cap 30. The radiation absorbing cap 30 is located in proximity to the reflector 22 such that it can receive solar energy collected by the reflector and contacts the first end 26 of the heat conducting element 24. As shown in FIG. 1, the first end 26 of the heat conducting element 24 is capped with the radiation absorbing cap 30. The reflector 22 focuses the solar radiation it receives on the radiation absorbing cap 30, which absorbs the solar radiation at all wavelengths. The solar radiation absorbed by the radiation absorbing cap 30 is then transferred to electrolytic solution 18 via the heat conducting element 24. As the radiation absorbing cap 30 absorbs heat, its temperature increases so that heat moves to the electrolytic solution 18 via the heat conducting element 24 under a temperature gradient. In one embodiment, the radiation absorbing cap 30 is located at a focal point of the reflector 22. The shape of the radiation absorbing cap 30 is configured to receive radiation that reaches the focal point from all directions.

The radiation absorbing cap 30 is formed of a material with a broad solar absorption spectrum, such as graphite or velvet. At least a portion of the surface of the radiation absorbing cap 30 may also comprise aligned carbon nanotubes.

The system further comprises a collection receptacle 32 connected to the pore 14 and a return channel 34 of the insulator 12. The collection receptacle 32 receives the electrolytic solution 18 that passes through the pore 14 from the container 16 in response to thermal expansion. The collection receptacle 32 may be optionally insulated.

The electrolytic solution 18 received in the collection receptacle 32 is then returned to the container 16 through the return channel 34. In one embodiment, the top surface of the insulator 12 that is exposed to the collection receptacle 32 is sloped such that the length of the pore 14 is greater than the length of the return channel 34. In this embodiment, the electrolytic solution 18 received in the collection receptacle 32 from the pore 14 flows under the force of gravity along the downward slope of the top surface of the insulator 12 in the direction of return channel 34. The electrolytic solution 18 then enters the return channel 34 and flows from the collection receptacle 32 to the container 16. The temperature of the electrolytic solution 18 received in the collection receptacle 32 is cooler relative to the temperature of the electrolytic solution 18 in the container, and therefore, more dense and easier to return to the container 16 through the return channel 34 with gravity. In another embodiment, the bottom of the insulator 12 is perpendicular to the walls of insulator 12 and the top of the insulator 12 is angled so that, when the system is mounted on a slanted roof, the top of the insulator 12 will be primarily horizontal with a slight downward slope toward the return channel 34.

The flow of electrolytic solution 18 through the return channel 34 may be controlled by a valve 36, such as a ball valve. The valve 36 will permit the electrolytic solution 18 to flow from the collection receptacle 32 to the container 16 through the return channel 34, but prevent the electrolytic solution 18 from traveling from the container 16 to the collection receptacle 32 through the return channel 34.

The pore 14 and the return channel 34 span the entire vertical length of the insulator 12 such that the pore 14 and the return channel 34 each have two openings, a first opening to the container 16 and a second opening to the collection receptacle 32, effectively connecting the container 16 to the collection receptacle 32.

At least a portion of the heat conducting element 24 may be insulated by an insulating layer 38 in order to maximize heat transfer to the electrolytic solution 18. The insulating layer 38 prevents loss of heat as the heat is transferred from the reflector 22 through the collection receptacle 32 and the insulator 12 via the heat conducting element 24. The portion of the heat conducting element 24 that extends into the electrolytic solution 18 of the container 16 is not insulated by the insulating layer 38. As shown in FIG. 1, the section of the heat conducting element 24 that extends through the collection receptacle 32 and the insulator 12 is insulated by the insulating layer 38. In one embodiment, the insulating layer 38 may also insulate at least a portion of the heat conducting element 24 that extends between the collection receptacle 32 and the radiation absorbing cap 30. The insulating layer 38 may be formed of any material with insulating capabilities, such as ceramic or Styrofoam.

The heat conducting element 24 extends through the reflector 22, the collection receptacle 32, the insulator 12 and into the container 16. The reflector 22, the collection receptacle 32 and the insulator 12 each have a central hole through which the heat conducting element 24 or the heat conducting element 24 and the insulating layer 38 may pass before reaching the container 16. The container 16 also has a central hole through which the un-insulated portion of the heating element 24 may pass into the electrolytic solution 18.

The system further comprises a first electrode contacting the electrolytic solution 18 on a first side of the insulator 12; and a second electrode contacting the electrolytic solution 18 on a second side of the insulator 12, the second side opposite the first side relative to the insulator 12. In one embodiment, the heat conducting element 24 is formed of carbon and is the first electrode and contacts the electrolytic solution 18 while in the container 16. In this embodiment, the second electrode contacts the electrolytic solution 18 after it has flowed from the container 16 through the pore 14 and into the collection receptacle 32. The insulating layer 38 also provides a barrier between the first electrode, i.e., the heat conducting element 24, and the second electrode. In one embodiment, the second electrode will rest on the top of the insulator 12 exposed to the collection receptacle 32 where the electrolytic solution exits the pore 14. The amount of the electrolytic solution 18 in the collection receptacle 32 is sufficient to contact the second electrode for electrical continuity. The second electrode may be formed of graphite fibers. The first electrode and the second electrode connect to an external converter for converting a current flowing through the first electrode and the second electrode into electrical energy.

The system is closed or sealed completely so that the same electrolytic solution 18 flows continuously between the container 16 and the collection receptacle 32. Thus, the system is configured in way such that the electrolytic solution 18 is not lost. The same electrolytic solution 18 may be continuously flowed from the container 16 through the pore 14 into the collection receptacle 32, and from the collection receptacle 32 through the return channel 34 back into the container 16. A sealant or "o" ring may be used to seal the area where the collection receptacle 32 meets the insulator 12 and where the insulator 12 meets the container 16.

The system may be adapted to include conversion for wind energy as well as solar energy. In such an embodiment, the collection receptacle comprises a cone-shaped top that, like an Erlenmeyer flask, minimizes the loss of electrolytic solution from the collection receptacle. The cone-shaped top of the collection receptacle forms a wind channel that can be oriented in the direction of the prevailing winds. The channel extends the horizontal length of the collection receptacle and is shaped so that the wind velocity is maximal as it passes over the entrance to the collection receptacle. The flow of wind through the channel over the collection receptacle creates a vacuum-effect, drawing the electrolytic solution from the container through the pore of insulator. The heat conducting element passes through the collection receptacle and the wind channel to the reflector. The passages from the collection receptacle to the wind channel may be arranged on either side of the heat conducting element. A system that converts wind energy and solar energy may also comprise an electrolytic solution reservoir.

The present invention also relates to a method for generating electricity. In use, an insulator 12 having at least one pore 14 that contains a fixed surface charge of one polarity is provided. A container 16 with an electrolytic solution 18 therein, the container 16 in fluid communication with the at least one pore 14 of the insulator 12 is also provided. A solar radiation absorber 20 is then exposed to solar radiation. The solar radiation received by the solar radiation absorber 20 is subsequently transferred in the form of heat to the electrolytic solution 18. The heat causes the electrolytic solution 18 to thermally expand. A first electrode is then connected to the electrolytic solution 18 on a first side of the insulator and a second electrode is connected to the electrolytic solution 18 on a second side of the insulator, the second side opposite the first side relative to the insulator 12. The thermal expansion of the electrolytic solution 18 causes the electrolytic solution to flow from the container 16 through the at least one pore 14 of the insulator 12 to generate an electrical current between the first electrode and the second electrode. Subsequently, the electrolytic solution 18 flowing from the container 16 through the at least one pore 14 of the insulator 12 is received in a collection receptacle 32 connected to the at least one pore 14. The electrolytic solution 18 may then be returned from the collection receptacle 32 to the container 16.

Figure 2:
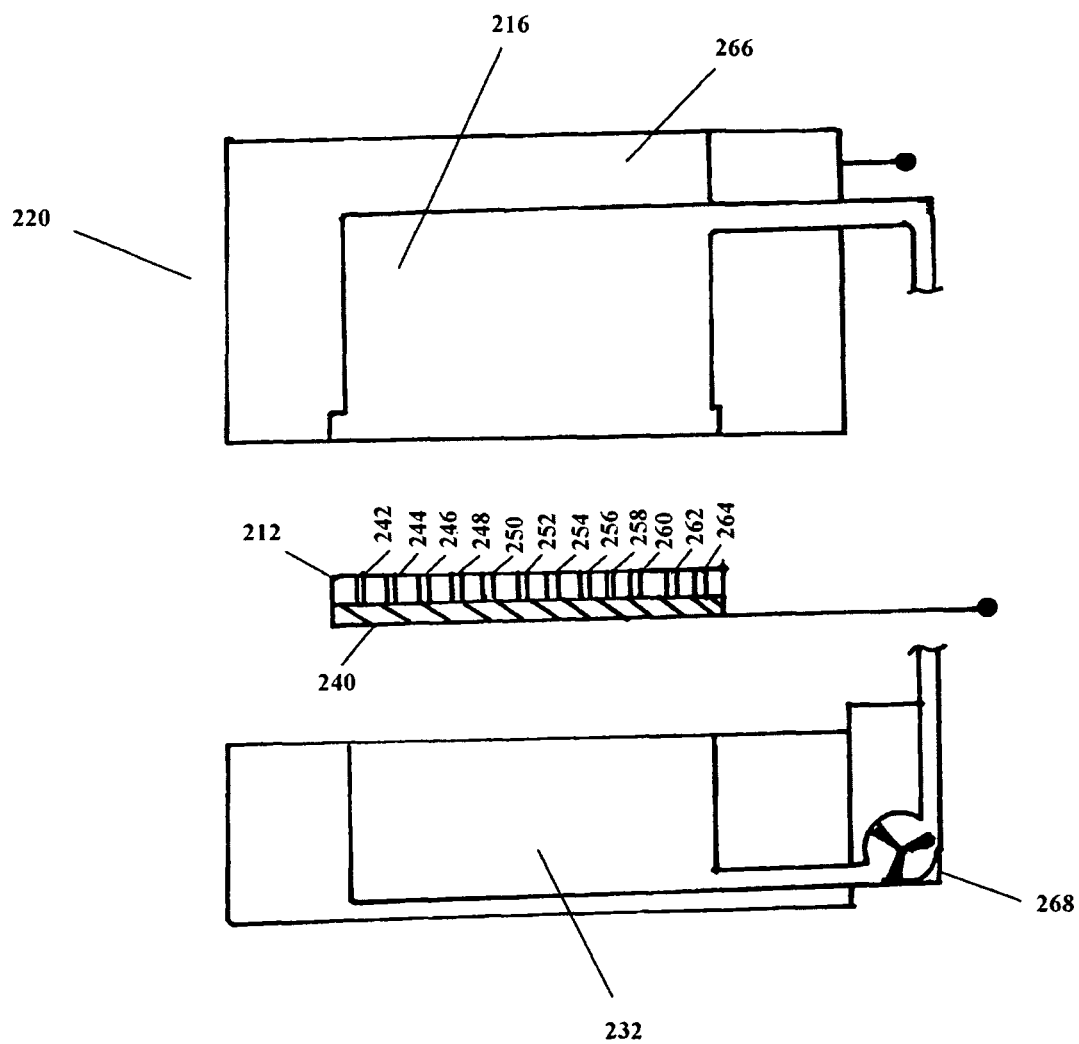
FIG. 2 is a cutaway front view of an alternative embodiment of the system for generating electrical energy in accordance with the present invention.

Turning to FIG. 2, an alternative embodiment of the system is presented. As shown, the insulator 212 completely covers the opening of the container 216 such that all of the expanding electrolytic solution from the container 216 must pass through the pores 242, 244, 246, 248, 250, 252, 254, 256, 258, 260, 262, 264 of the insulator 212. In one embodiment, the solar radiation absorber 220 is a chamber 266 that encases the container 216, the insulator 212 and the collection receptacle 232. The chamber 266 may be formed of graphite, a material that absorbs the full visible spectral range of solar radiation. In this embodiment, the chamber 266 absorbs solar radiation and transfers the absorbed energy in the form of heat to the electrolytic solution in the container 216. The transfer of heat to the electrolytic solution causes the thermal expansion of the electrolytic solution, further causing the electrolytic solution to flow through the pores 242, 244, 246, 248, 250, 252, 254, 256, 258, 260, 262, 264 of the insulator 212. The solar radiation absorber 220 may also be a solar absorbing plate that rests on top of the container 216 and transfers heat to the electrolytic solution in container 216.

In an alternative embodiment, a light absorbing material, such as solubilized amorphous carbon, is dissolved in the electrolytic solution and the container has a transparent face to transmit radiant energy directly to the electrolytic solution via the light absorbing molecules. The volume of electrolytic solution received in the container is determined by local conditions. A smaller volume of electrolytic solution is suitable for clear, sunny regions. A larger volume of electrolytic solution is suitable for cloudier regions where the larger volume of heated electrolytic solution maintains flow through the pores even when the sun is obscured to give an averaged electrical energy production.

Returning to FIG. 2, in one embodiment, the electrolytic solution that flows from the container 216 through the pores 242, 244, 246, 248, 250, 252, 254, 256, 258, 260, 262, 264 is collected in a collection receptacle 232 and returned to the container 216 by a pump 268. In a slanted orientation, e.g. the system is mounted on a slanted roof facing the south, the electrolytic solution is collected at the lowest point in the collection receptacle 232 and returned to the container 216 with the pump 268 that is activated when the height of electrolytic solution in the collection receptacle 232 reaches a threshold. The pump 268 is ratcheted to maintain the volume of the electrolytic solution in the container 216 and prevent backflow from the container 216 to the collection receptacle 232. The energy to raise the electrolytic solution against gravity is a small percentage of the total energy generated by expansion and is minimized using a pump 268 that is activated only when the electrolytic solution in the collection receptacle 232 reaches a threshold volume.

In one embodiment, the chamber 266 functions as the first electrode. The first electrode is electrically isolated from a second electrode 240 that contacts the electrolytic solution that has flowed through the pores 242, 244, 246, 248, 250, 252, 254, 256, 258, 260, 262, 264 to the collection chamber 232. The second electrode 240 may be a wire screen bonded to the surface of the insulator 212 that is exposed to the collection receptacle 232. The second electrode is formed of a conducting material, such as copper.

The solar radiation absorber 220 may also be a solar absorbing plate that rests on top of the container 216 and transfers heat to the electrolytic solution in container 216. The solar absorbing plate may be an integral part of the container. Alternatively, chamber 30 may be transparent to expose solar radiation where a light absorbing material has been dissolved in the electrolytic solution in the container 216. The insulator 212 fits within the container 216.

The collection receptacle 232 collects the electrolytic solution that has passed from the container 216 through the pores 242, 244, 246, 248, 250, 252, 254, 256, 258, 260, 262, 264 in the insulator 212. In one embodiment, a sensor monitors the electrolytic solution level of the collection receptacle and sends a voltage pulse to operate the pump 268 to transfer electrolytic solution from the collection receptacle 232 to the container 216 to maintain the volume of electrolytic solution in the container 216. The pump 268 also prevents backflow of electrolytic solution to the collection receptacle 232.

Figure 3:
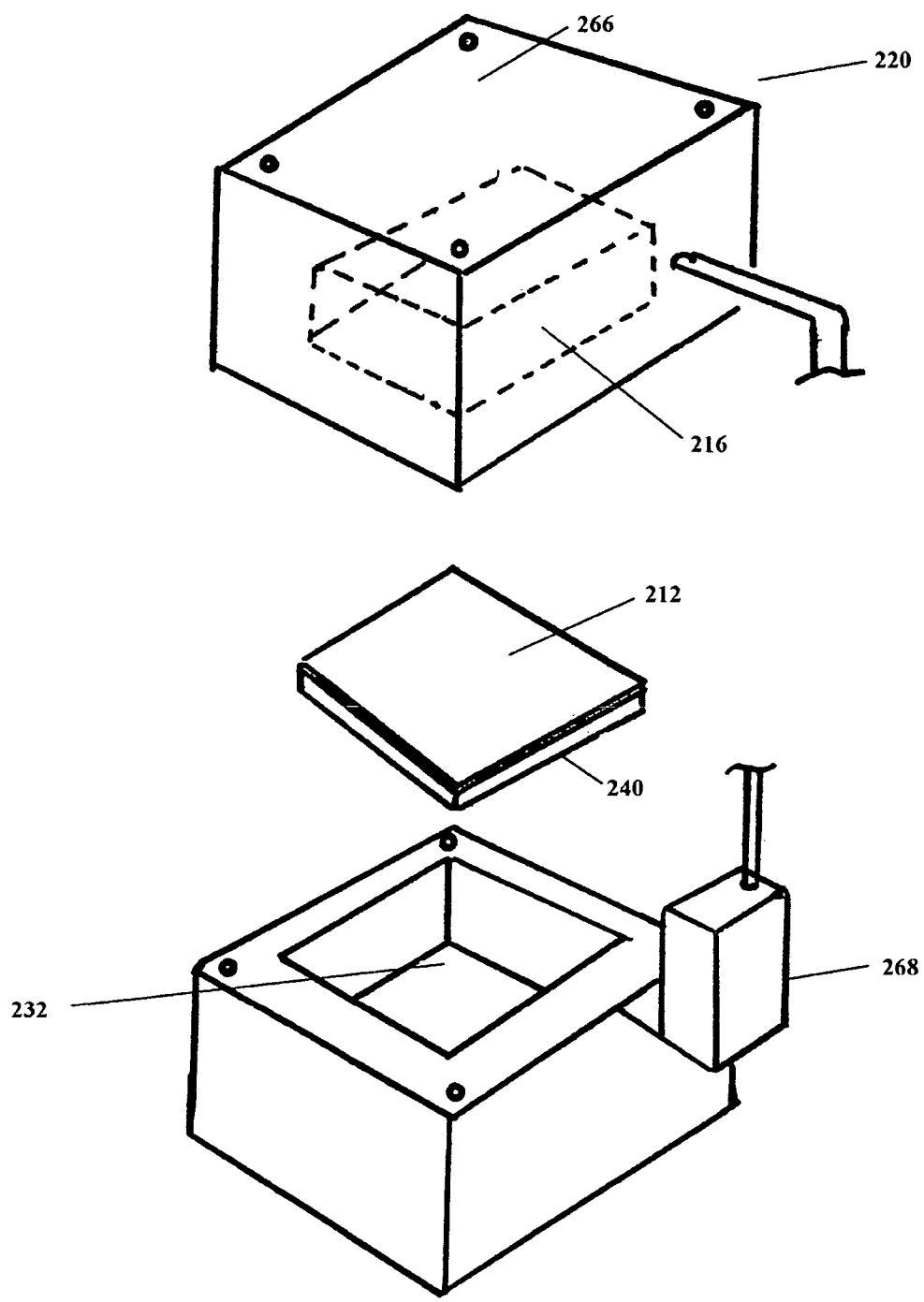
FIG. 3 is a perspective drawing of an alternative embodiment of the system for generating electrical energy in accordance with the present invention.

The same embodiment is illustrated as a perspective drawing in FIG. 3. The container 216 may be encased in a chamber 266 formed of graphite. The insulator 212 and second electrode 240 fit snugly into the container 216 so that all of the electrolytic solution flows through the pores. The collection receptacle 232 is drained by the pump 268 that refills the container 216.

As shown, the first electrode is the chamber 266 formed of graphite that connects to a converter. The second electrode 240 is a wire screen that connects to a converter. The region between the chamber 266 and the container 216 is electrically insulated to prevent a short circuit between the two electrodes.

The average solar radiation power is 0.1 W/cm$^2$. This radiation will impinge on a parabolic mirror of 930 cm$^2$ (0.5 ft radius) to produce 93 W=93 J/s at the absorber. Assuming perfect heat transfer, this energy is transferred to 25 cm$^3$=25 g of the electrolytic solution to give a temperature rate of rise of 0.93 deg/s. Water's thermal expansion coefficient of $0.207 \times 10^{-3}$ deg$^{-1}$ (Handbook of Chemistry and Physics) gives a rate of expansion of $4.8 \times 10^{-3}$ cm$^3$/s for the square foot of absorbing surface.

A single pore of 10μ diameter has area $7.85 \times 10^{-5}$ cm$^2$. The expanding elextrolytic solution forced through this single pore gives a velocity of 610 cm/sec. The Reynolds number for this velocity and diameter is 30 indicating that the flow will be lamellar, i.e., a streaming potential is possible.

The streaming current for a surface charge "density" of 4 C/m$^2$ (1 negative charge per 20 nm$^2$ is $1.26 \times 10^{-4}$ A. The conductance ($G=8 \times 10^{-1}$ Sm) is determined for a single pore with 10μ diameter and 1 cm long with conductivity estimated for a 10 mM concentration, The streaming power ($i^2/G$) for all flow through this single pore is 20 W. The total solar energy absorbed (93 W) suggests a conversion efficiency of 11%.

These values assume that the pore can sustain a flow of 610 cm/s and that all the energy is absorbed and transferred to the electrolytic solution. Parameters such as the solution concentration, length of the pore and pore diameter can be altered to increase the power per pore. These calculations assume a double layer gradient equal to the velocity, i.e. the co-ions are moving through the center of the pore. The pore and solution electrolytes are selected to approach this limit.

Assuming 0.1 W/cm$^2$ solar radiation strikes the system for 10 hours each day for a month, the device with the parameters above produces 600 kWhr of power. Comparing electrical usage for a five bedroom home in upstate New York (1200 kWhr), this device could supply 50% of the necessary energy for the dwelling. Thus, a larger system could provide 100% of the necessary electrical energy requirement.

It will be recognized by those skilled in the art that changes or modifications may be made to the above described embodiments without departing from the broad inventive concepts of the invention. It should be therefore be understood that the invention is not limited to the particular embodiments described herein but is intended to include all changes and modifications that are within the scope and spirit of the invention as set forth in the claims.

The invention claimed is:

1. A system for generating electrical energy comprising:
    an insulator having at least one pore that contains a fixed surface charge of one polarity;
    a container receiving an electrolytic solution, said container in fluid communication with the at least one pore of the insulator;
    a solar radiation absorber configured to transfer heat to the electrolytic solution of the container to cause thermal expansion of the electrolytic solution such that the electrolytic solution flows from the container through the at least one pore of the insulator;
    said radiation absorber comprising a reflector and a heat conducting element having a first end and a second end, said first end connected to said reflector, said second end extending into the container to thermally couple said second end to the electrolytic solution to allow a flow of thermal energy from said first end to the electrolytic solution;
    a connecting portion of said heat conducting element between said first end and said second end extending through a collection receptacle and said insulator before reaching the electrolytic solution in said container;
    said collection receptacle connected to, the at least one pore of the insulator to receive a portion of the electrolytic solution that has passed through the at least one pore from the container;
    a first electrode contacting the electrolytic solution on a first side of the insulator; and
    a second electrode contacting the electrolytic solution on a second side of the insulator, the second side opposite the first side relative to the insulator;
    a conduit connecting the container to the collection receptacle to allow a flow of the portion of the electrolytic solution from the collection receptacle to the container to allow the portion to be thermally coupled to the second end in the container.

2. The system of claim 1, wherein the electrolytic solution received in the collection receptacle flows to the container via gravity to allow for re-expansion of the electrolytic solution such that the electrolytic solution flows from the container through the at least one pore of the insulator.

3. The system of claim 2, wherein the flow of electrolytic solution from the collection receptacle to the container comprises flow through a return channel of the insulator controlled by a valve.

4. The system of claim 1, wherein the at least one pore comprises glass with an intrinsic negative surface charge.

5. The system of claim 1, wherein the insulator comprises plastic and the at least one pore comprises glass with an intrinsic negative surface charge.

6. The system of claim 1, wherein the reflector is a parabolic mirror.

7. The system of claim 1, wherein the heat conducting element is a carbon rod.

8. The system of claim 1, wherein the first electrode contacting the electrolytic solution is the heat conducting element.

9. The system of claim 1, wherein the solar radiation absorber comprises a radiation absorbing cap.

10. The system of claim 9, wherein the radiation absorbing cap is located at a focal point of the reflector.

11. The system of claim 9, wherein the first end of the heat conducting element contacts the radiation absorbing cap.

12. The system of claim 1, wherein the system is closed to prevent the loss of electrolytic solution.

13. The system of claim 1, wherein the multi-charged particles comprising the electrolytic solution are large multi-charged ions.

14. The system of claim 1, wherein the flow of electrolytic solution through at least one pore is produced by both solar energy allowing for the thermal expansion of the electrolytic solution and wind across an exposed surface of the collection receptacle to create a pressure differential on the pores.

15. The system of claim 9, wherein the radiation absorbing cap comprises graphite.

16. A method for generating electricity comprising:
    providing an insulator having at least one pore that contains a fixed surface charge of one polarity;
    providing a container with an electrolytic solution therein, the container in fluid communication with the at least one pore of the insulator;
    exposing a solar radiation absorber to solar radiation and thermally coupling the solar radiation absorber to the electrolytic solution in the container;
    transferring heat from the solar radiation absorber to the electrolytic solution to thermally expand the electrolytic solution;
    connecting a first electrode to the electrolytic solution on a first side of the insulator;
    connecting a second electrode to the electrolytic solution on a second side of the insulator, the second side opposite the first side relative to the insulator;
    the thermal expansion of the electrolytic solution in the container causing a portion of the electrolytic solution to flow from the container through the at least one pore to generate an electrical current between the first electrode and the second electrode;
    receiving the portion of the of the electrolytic solution flowing from the container through the at least one pore in a collection receptacle connected to the at least one pore;
    flowing the portion of the electrolytic solution through a conduit from the collection receptacle to the container;
    thermally coupling the solar radiation absorber to the portion in the container and received from the collection receptacle to heat the portion to cause the portion to flow from the container through the at least one pore;
    wherein the radiation absorber comprises a reflector and a heat conducting element having a first end and a second end, the first end connected to the reflector, the second end extending into the container, wherein the thermally coupling the radiation absorber to the solution comprises thermally coupling the second end to the electrolytic solution to allow the transferring the heat;
    wherein a connecting portion of the heat conducting element between the first end and the second end extends through the collection receptacle and the insulator before reaching the electrolytic solution in the container.

17. The method of claim 16, further comprising returning the electrolytic solution from the collection receptacle to the container.

18. The system of claim 1, wherein the insulator further comprises a return channel, said return channel in fluid communication with the container and the collection receptacle.

19. The system of claim 18, wherein the return channel further comprises a valve.

* * * * *